United States Patent [19]

Nagashima et al.

[11] Patent Number: 4,569,038
[45] Date of Patent: Feb. 4, 1986

[54] OPTICAL DISK, HIGH DENSITY OPTICAL DISK SYSTEM, AND HIGH DENSITY RECORDING/REPRODUCING METHOD USING THE OPTICAL DISK

[75] Inventors: Michiyoshi Nagashima; Mutsuo Takenaga, both of Osaka, Japan

[73] Assignee: Matsushita Electric Industrial Co., Ltd., Osaka, Japan

[21] Appl. No.: 331,840

[22] Filed: Dec. 17, 1981

[30] Foreign Application Priority Data

Dec. 19, 1980 [JP] Japan .................. 55-180685

[51] Int. Cl.$^4$ .................. H04N 5/76; G11B 7/00
[52] U.S. Cl. .................. 369/44; 369/109; 369/111; 369/275; 358/342
[58] Field of Search .................. 369/18, 44–47, 369/52, 93, 109–111, 118–119, 275; 358/342

[56] References Cited

U.S. PATENT DOCUMENTS

| | | | |
|---|---|---|---|
| 3,138,669 | 6/1964 | Rabinow et al. | 369/18 |
| 3,235,672 | 2/1966 | Beguin | 369/111 |
| 3,818,148 | 6/1974 | Dickopp | 369/18 |
| 3,860,766 | 1/1975 | Mori | 369/111 |
| 3,913,076 | 10/1975 | Lehureau et al. | 369/46 |
| 3,941,945 | 3/1976 | Borner et al. | 369/18 |
| 3,980,811 | 9/1976 | Schaefer et al. | 369/109 |
| 3,992,593 | 11/1976 | Heine | 369/18 |
| 4,006,292 | 2/1977 | Schaefer | 369/111 |
| 4,180,830 | 12/1979 | Roach | 369/109 |
| 4,232,337 | 11/1980 | Winslow et al. | 369/44 |
| 4,310,916 | 1/1982 | Dil | 369/275 |
| 4,325,135 | 4/1982 | Dil et al. | 369/275 |
| 4,331,976 | 5/1982 | Kinjo et al. | 358/342 |
| 4,375,096 | 2/1983 | Gorog et al. | 369/109 |

FOREIGN PATENT DOCUMENTS 1435299  5/1976  United Kingdom .............. 369/111

Primary Examiner—Robert L. Richardson
Attorney, Agent, or Firm—Burgess, Ryan & Wayne

[57] ABSTRACT

An optical disk recording and reproducing system which uses an optical disk at least one side of which is formed with a spiral groove which has a V-shaped or inverted-trapezoid-shaped cross sectional configuration. Both the radially inward and outward sloped faces of the groove are used as recording tracks which are tracked or scanned with the spot of a light beam in the case of recording or reproduction.

27 Claims, 29 Drawing Figures

OPTICAL DISK, HIGH DENSITY OPTICAL DISK SYSTEM, AND HIGH DENSITY RECORDING/REPRODUCING METHOD USING THE OPTICAL DISK

BACKGROUND OF THE INVENTION

1. Field of the Invention

The present invention relates to an optical storage disk which can store information at an extremely high storage density and a recording and reproducing system using such optical storage disks.

2. Prior Art

An information reproducing system has been devised and demonstrated in which the information prerecorded on an optical storage disk is reproduced by focusing a coherent light beam such as a laser beam into an extremely fine spot on the disk and scanning or tracking the recording tracks, thereby reproducing the prerecorded information. Such prerecorded optical storage disks have been available on the market as "VIDEO DISK". In order to store or record information or data, holes are formed in a disk so that the prerecorded information can be detected in terms of the difference in phase between the light reflected from such formed hole and the light reflected from the disk in places where a hole has not been formed.

There have been also devised and demonstrated various types of optical storage disks on which the user can record any desired information that he or she wants. The surface of such disk is deposited with a thin film of a photosensitive recording medium whose optical properties are changed when exposed to the spot of a light beam. In the near future such optical storage disks will be widely used as data files and will be developed into recordable optical video disk system in which information can be recorded. At present, thin recording films comprise metals such as Te, tellurium suboxides TeOx ($0 < x < 2$) or MnBi which exhibits opto-magnetic properties. In the case of the thin metal film, holes are formed by the laser beam; in the case of the thin TeOx film, the optical properties of a spot exposed to the laser beam are changed; and in the case of the thin film of an opto-magnetic medium, the rotation of polarizing angle is used for the recording and readout.

One of the typical commercially available, replay-only optical video disks is 30 cm in diameter and has recording tracks spaced apart from each other by 1.67 $\mu$m. If the NTSC system is used for prerecording and reproducing the video signal on and from such disk, a program of motion picture can be displayed for 30 minutes by spinning the disk at 1800 rpm and scanning the recording track with the spot of a HeNe laser which is coherent. However, in practice, the display time of only 30 minutes is too short, so that there has been strong demands for optical video disks capable of displaying a longer time. There has been already proposed an improved optical video disk which has a display or reproduction time twice as long as that of the conventional disk. In this disk, other recording tracks are interposed between the recording tracks so that the crosstalk problem can be reduced to a minimum level.

One method for minimizing the crosstalk problem is to vary the depths of hole pits between the adjacent recording tracks. For instance, according to the disclosure of Japanese Laid Open Patent Application No. 12805/1979, first tracks in which pits have a depth of 1.8 $\mu$m and second tracks in which pits have a depth of 2.0 $\mu$m are alternately arrayed or interlaced and a first laser beam of a wavelength of 800 nm is used to scan the first tracks while a second laser beam 900 nm in wavelength is used to scan the second tracks. With the laser beam 800 nm in wavelength, the difference in phase between the ray of light reflected from the pit 2.0 $\mu$m in depth and the ray of light reflected from the undisturbed place becomes an integer multiple of the wavelength. Therefore, the pits of 2.0 $\mu$m in depth become an optical flat surface to the laser beam 800 nm in wavelength. Therefore, the recorded data can be read out in terms of the difference in phase between the ray of light reflected back from the pit of 1.8 $\mu$m in depth and the ray of light reflected back from the undisturbed place. The readout with the laser beam 900 nm in wavelength is substantially similar to that described above. However, this system has a defect that stable control for focusing the spots of two laser beams cannot be ensured because the pits are too deep. In order to vary the depth of pits as described above, photoresist films are used and the intensity of a laser beam is varied depending upon the desired depth. As a result, it is extremely difficult to control the depth of each pit with the desired degree of accuracy.

Japanese Laid Open Patent Application No. 136303/1979 teaches to use a laser beam of a wavelength of $\lambda$ to scan or track first and second recording tracks which are alternately interlaced, the first tracks having pits of $\lambda/4$ in depth while the second track, pits of $\lambda/8$ in depth. First and second photodetectors are used and spaced apart from each other by a predetermined distance in the direction in parallel with the recording tracks in order to intercept the rays of light reflected back from the disk. The signal recorded along the second tracks with the pits of $\lambda/8$ in depth is detected in terms of the difference between the outputs from the first and second photodetectors while the signal recorded along the first tracks with the pits of $\lambda/4$ in depth, in terms of the sum of the outputs from the first and second photodetectors. However, it is still extremely difficult to form such pits with a desired degree of dimensional accuracy and consequently the above-described system is unsatisfactory in practice.

In the case of the real-time recordable optical storage disk, it is almost impossible to change the recording or reproduction method between the adjacent recording tracks. At present, a maximum motion-picture display or reproduction time of the optical video disk of a diameter of 30 cm is only 30 minutes.

In the recording-and-reproducing system with the optical storage disk, semiconductor lasers have become widely used because they are compact in size and the direct power modulation is possible. For the recording of data, a high-output laser beam must be used which has the wavelength in the near-infrared radiation range. With such a laser beam, it is impossible to focus a spot whose diameter is as small as that of the spot of a HeNe laser beam (0.633 $\mu$m in wavelength). It is possible if a lens with a higher numerical aperture NA is used, the laser beam can be focused into a very small spot, but the increase in numerical aperture NA is limited because of the aberration effects which are caused due to the variations in thickness of the optical storage disk. Therefore, it has been impossible to reduce the track pitch or spacing below 1 $\mu$m. Consequently, research and development for an increase in storage density on the optical storage disk must be started from a novel underlying principle which is completely different from those of the conventional recording and reproducing systems.

SUMMARY OF THE INVENTION

The primary object of the present invention is to provide a recording and reproducing system using optical storage disks at least one side of a substrate of which is formed with a spiral groove or grooves which have a V-shaped or inverted-trapezoid-shaped cross sectional configuration so that all the sloped surfaces of the grooves can be used as recording tracks, whereby the track pitch is reduced to one half of that of the conventional optical storage disk and consequently the storage density can be remarkably increased.

Another object of the present invention is to provide a recording and reproducing system which can reduce the crosstalk between the adjacent recording tracks even though the track pitch is reduced as described above.

BRIEF DESCRIPTION OF THE DRAWINGS

FIGS. 2A and 2B are partial perspective views of an optical storage disk with inverted-trapezoid-shaped recording grooves;

DESCRIPTION OF THE PREFERRED EMBODIMENTS

First, the structure and fabrication process of recordable optical video disks and then those of replay-only optical video disks, both of which can attain a higher degree of recording density, will be described.

Figure 1A:
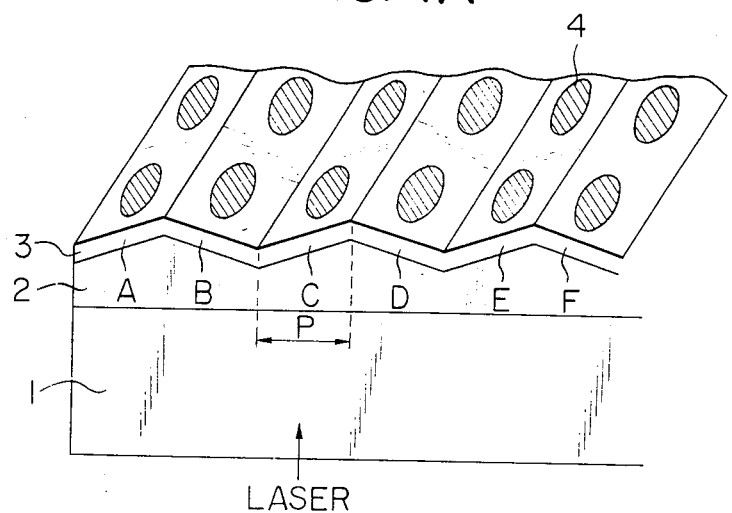
FIGS. 1A and 2A, each consisting of A-F, are partial perspective views of an optical storage disk with V-shaped recording grooves.

FIG. 1 shows in partial perspective view a recordable video disk which uses laser light for reading and writing video information. It comprises a transparent substrate 1, a layer of transparent resin 2 which was cured by the irradiation of ultraviolet rays (to be referred to as "the UV resin layer" for brevity in this specification) and which is formed with a plurality of grooves or pregrooved tracks in the form of a V or an inverted trapezoid in cross section, and a thin film of recording medium 3. Video information is recorded in the form of dots 4 by a laser beam as will be described in more detail below.

Since information on the optical video disk must be recorded or reproduced by a laser beam transmitted through the substrate 1 and the UV resin layer 2, they must be transparent, but it is to be understood that the present invention is not limited to this method and that a laser beam can be focused from the opposite side or surface.

Figure 2A:
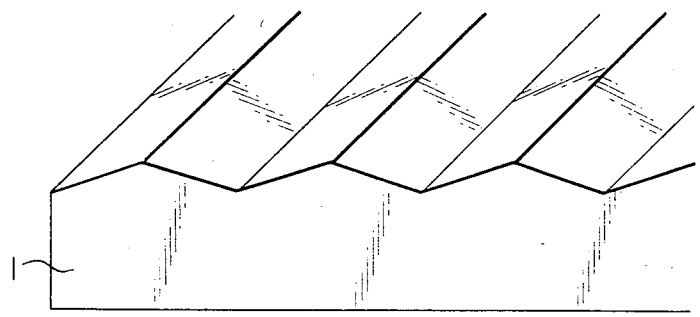
Figure 2B:
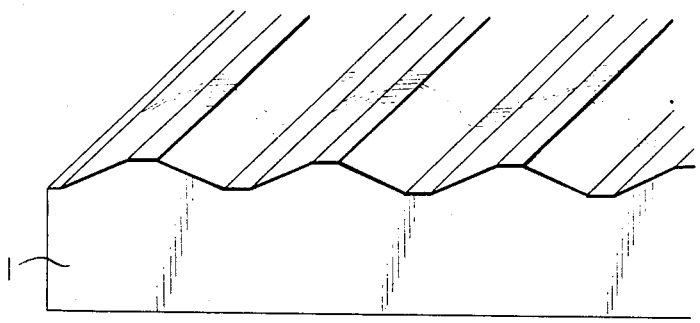
Figure 3A:
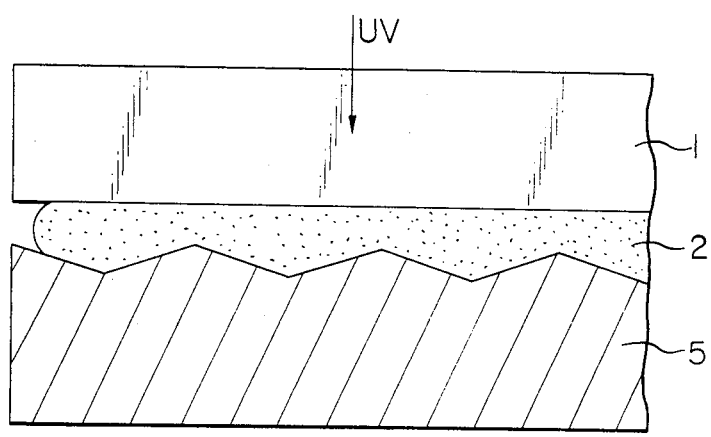
FIGS. 3A and 3B are views used to explain one of the steps for fabricating the optical storage disks shown in FIGS. 1A and 1B or FIGS. 2A and 2B.
Figure 3B:
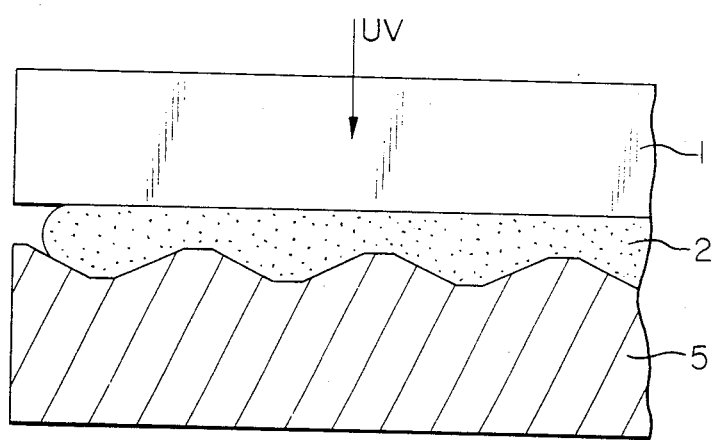

Next, the process for fabricating such optical video disks of the type described will be explained. The substrate 1 which is made of, for instance, an optically transparent acrylic resin, is formed with a plurality of grooves or pregrooved tracks as shown in FIG. 2A or FIG. 2B which are V-shaped or trapezoidal in cross section. To this end, a stamper 5 or 6 as shown in FIG. 3A or FIG. 3B is prepared by cutting grooves in the form of a V or an inverted trapezoid in cross section in the surface of a metal disk of, for instance, copper with a V- or trapezoid-shaped diamond cutting tool or stylus and then by plating the grooved surface with nickel or coating it with a silicon rubber. Thereafter, a blank disk substrate 1 is pressed against the stamper 5 or 6 with a layer of UV resin 2 interposed therebetween and then flooded with the ultraviolet radiation, whereby a blank optical video disk is prepared. (Reference is made to a U.S. Pat. No. 4,112,030.)

According to the present invention, the recording density of the optical video disk can be remarkably improved as will be described in detail below in conjunction with the V-shaped pregrooved tracks. A spot of light is focused on one sloped surface (for instance, the sloped C in FIG. 1A) of a V-shaped groove so that video information bits or dots 4 are recorded in the thin film 3. If the track pitch 2P is equal to that of the conventional prerecorded video disk, the cross talk between the sloped surfaces A and E is less even when the conventional optical video reproducing system is used for reproduction. According to the present invention, however, video information is recorded on the opposite sloped surfaces B and D in order to increase the recording density. Therefore, in order to minimize the cross talk from the video signals recorded on the sloped surface B or D when the video signal recorded on the side wall surface C is reproduced, the cross sectional configuration of the V-shaped groove is so determined as not to degrade the signal quality. In addition, a novel recording and reproducing system embodying the present invention must be used.

When the laser beam is incident on the video disk the latter acts as a two-dimensional diffraction grating so that the reflected or transmitted laser light beam comprises many numbers of diffracted beams or rays. First, the reflected light beam will be described with reference to FIG. 4. A cartesian coordinate system is constructed by constructing the X- and Y-axis which intersect at the origin O on the surface of a lens 7. The X-axis is in parallel with the radius of the video disk while the Y-axis is extended in the tangential direction of the rim of the video disk; that is, in the direction perpendicular to the paper surface of FIG. 4. The electric field pattern or distribution of the light beam $I_o$ incident on the lens 7 is indicated by $A(x, y)$ and the radius of the cross section of the incident light beam is indicated by W. Then $x^2+y^2 \leq W^2$. The axes $\xi$ and $\eta$ are constructed on the recording plane of the optical video disk in parallel with the X- and Y-axes, respectively. The electric field B at a point $(\xi,\eta)$ on the $\xi$-$\eta$ plane of the light beam focused thereon can be expressed by the following equation when no coefficient of proportionality is taken into consideration:

$$B(\xi,\eta) = \iint_\Sigma A(x,y)\exp\left( -i\frac{k}{f}(\xi x + \eta y) \right) dx \cdot dy$$

That is, the electric field distribution is a Fourier transform of the incident laser distribution over a surface area $\Sigma$ where the incident light beam exists on the X-Y surface. Let f denote the focal length of the lens 7; k, the number of waves; and $\lambda$, the wavelength of the laser beam. Then, $k=2\pi/\lambda$.

The symbol $R(\xi,\eta)$ represents the complex reflectivity at a point $\xi$ and $\eta$ on the recording plane of the optical video disk, and this $R(\xi,\eta)$ affects the electric field of light. The u- and v-axes are constructed which are coincident with the X- and Y-axes, respectively, over the lens surface for the analysis of the reflected light beam. The electric field over the u-v surface at a point $(u,v)$ of the reflected light beam can be also expressed by a Fourier transform as follows if the coefficient of proportionality is not taken into consideration:

$$U(u,v) = \iint_{-\infty}^{\infty} B(\xi,\eta)R(\xi,\eta)\exp\left( -i\frac{k}{f}(u\xi + v\eta) \right) d\xi d\eta$$

The surface area of integration is the $\xi$-$\eta$ plane which is indefinitely extended. According to the present invention, the groove has the period of 2P as shown in FIG. 1. Therefore, the complex reflectively distribution $R(\xi,\eta)$ is periodical (with the period of 2P) in the direction of the $\xi$ axis. Using the Fourier series $$R(\xi,\eta) = \sum_l Rl \exp\left( 2\pi i \frac{l}{2P} \xi \right)$$

we can rewrite $U(u,v)$ as follows:

$$\left.\begin{array}{l} U(u,v) = \sum_l RlEl(u,v) \\ \text{where } El(u,v) = A\left( -u + \frac{\lambda f}{2P} l, v \right) \\ \left( -u + \frac{\lambda f}{2P} l \right)^2 + v^2 \leq W^2 \end{array}\right\} \quad (1)$$

(The process for obtaining Eq. (1) is described in detail in J. Opt. Soc. Am. Vol. 69, No. 1, page 4, with a different coordinate system.)

Figure 5:
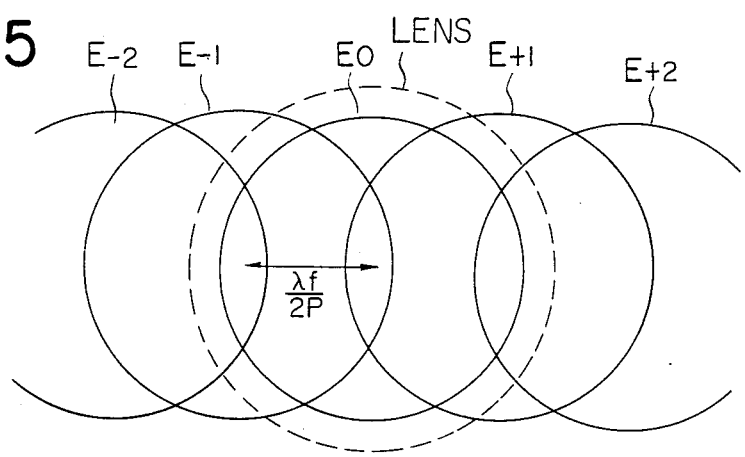
FIG. 5 shows patterns on the surface of a lens of reflected and diffracted light.

Eq. (1) shows the following facts. First of all, the reflected light beam can be separated into a large number of diffracted light beams. $E_l$ (l=0, ±1, ±2, ...) represents the electric field of the l-th diffracted light beam on the u-v plane and has the same radius W as the electric field $A(x,y)$ of the incident light beam. The spacing between the diffracted light beams over the u-v plane is $\lambda f/2P$ as shown in FIG. 5. And the distribution of the incident laser and these of the diffracted light beam $E_l$ are all similarly. The amplitude and phase of each of reflected-diffracted light beam $E_l$ are dependent upon the complex coefficient $R_l$. In general, the complex reflectivity distribution is periodic also in the direction of the $\eta$ axis. The diffracted light beam and complex coefficient are considered two-dimensionally and two subscripts are needed so that $E_{lm}$ and $R_{lm}$. However, in order to determine only the cross sectional configuration of the grooves according to the present invention, the distributions in the direction of the $\eta$ axis can be considered uniform so that it will suffice to consider the distributions only in the direction of the $\xi$ axis or one-dimensionally.

Referring back to FIG. 4, the complex reflectivity distribution $R(\xi,\eta)$ from the V-shaped groove as shown in FIG. 4 will be discussed. The track pitch is represented by P and the angle of inclination of the sloped of the grooves, by $\theta$. The reflectivity of the sloped surface C is denoted by $|\gamma_1|^2$ and those at the sloped surfaces B and D, by $|\gamma_2|^2$. The complex reflectivity are designated by $r_1$ and $r_2$, respectively. Therefore, the surfaces having the complex reflectivity $\gamma_1$ and $\gamma_2$, respectively, are alternately and periodically arrayed. In practice, video information different from that on the sloped surface C is recorded on the sloped surfaces B and D. In order to minimize the cross talk between the information reproduced from the sloped surface C and the information reproduced from the sloped B and D in the reproduction of the information from the sloped surface C, it only suffices to find out the conditions that the adverse effects from $r_2$ can be reduced to a minimum under the conditions that the reflectivity of the side wall surfaces B and D are the same. The case where only the change of the reflectivity of pits affect the light beam reflected from the disk and the phase of the light beam back from the disk are not affected is considered. Therefore, the reflectivity $\gamma_1$ and $\gamma_2$ can be treated as real numbers. With a thin film of TeOx (0<x<2), the phase difference between the interior and exterior of information pit can be reduced and a sufficient amount of difference in reflectivity between them can be attained by suitably selecting the thickness of the film (See the U.S. Pat. No. 4,430,883). Since the reflectivity at the spot at which the light beam is focused varies in time depending upon the recorded information, the reflectivity $r_1$ and $r_2$ are the functions of time t.

The reflectivity $R(\xi,\eta)$ is not dependent upon $\eta$ and can be expressed as follows:

$$R(\xi,\eta) = \begin{cases} r_2 \exp\left\{ 2ik\left(\frac{3P}{2}+\xi\right) n\cdot\tan\theta \right\} \\ \quad \left(-P \leq \xi \leq -\frac{P}{2}\right) \\ r_1 \exp\left\{ 2ik\left(\frac{P}{2}-\xi\right) n\cdot\tan\theta \right\} \\ \quad \left(-\frac{P}{2} \leq \xi \leq \frac{P}{2}\right) \\ r_2 \exp\left\{ 2ik\left(\xi-\frac{P}{2}\right) n\cdot\tan\theta \right\} \\ \quad \left(\frac{P}{2} \leq \xi \leq P\right) \end{cases}$$

where n is the refraction index of a medium in the incidence space (through which the laser beam of the wavelength $\lambda$ falls on the surface of the V-shaped groove) in contact with the V-shaped groove. The coefficients of the Fourier series of $R(\xi,\eta)$ are given by $$R_l = (-1)^l \exp\left(i \cdot l\frac{\pi}{2}\right) \times$$

$$\left[\frac{r_1}{2} \exp\left\{ ik\left(d+\frac{\lambda\cdot l}{4}\right)\right\} \text{Sinc}\left(ik\left(d+\frac{\lambda\cdot l}{4}\right)\right) + \right.$$

$$\left. \frac{r_2}{2} \exp\left\{ ik\left(d-\frac{\lambda\cdot l}{4}\right)\right\} \text{Sinc}\left(ik\left(d-\frac{\lambda\cdot l}{4}\right)\right)\right]$$

where $d = n\ p\ \tan\theta$ which represents the optical depth of the V-shaped groove, and Sinc $(x) = \sin(x)/x$.

If the angle of inclination $\theta$ of the V-shaped groove, the track pitch P and the wavelength of the laser beam $\lambda$ satisfy the following relationship $$\tan\theta = \lambda/(4pn) \quad (2)$$

that is, if the optical depth of the V-shaped groove is one quarter of the wavelength $\lambda$, $R_l (l=0, \pm1, \pm2, \ldots)$ are $$R_0 = \frac{i}{\pi}(r_1 + r_2), \quad (3)$$

$R_1 = -(i/2)\ r_2,\ R_{-1} = (i/2)\ r_1$
$R_2 = (i/\pi)(r_2 - r_1/3),\ R_{-2} = (i/\pi)(r_1 - r_2/3)$

Therefore, it follows that when the video information is reproduced from the sloped surface C, the $(-1)$-st reflected-diffracted light $E_{-1}$ contains the information $r_1$ only and is not dependent upon the reflectivity $r_2$ of the side wall surfaces B and D. However, the zero-order diffracted light beam is dependent upon both $r_1$ and $r_2$, and the influence of $r_2$ in $(-2)$-nd diffracted light is small. The $(-1)$-st diffracted beam is in phase with the 0-th refracted light beam, but the $(+1)$-st diffracted beam is out of phase from the zero-th diffracted light beam by 180°. The distribution of the electric field of the reflected light beam over the u-v plane is the summation of the interference between these diffracted light beams.

Figure 4:
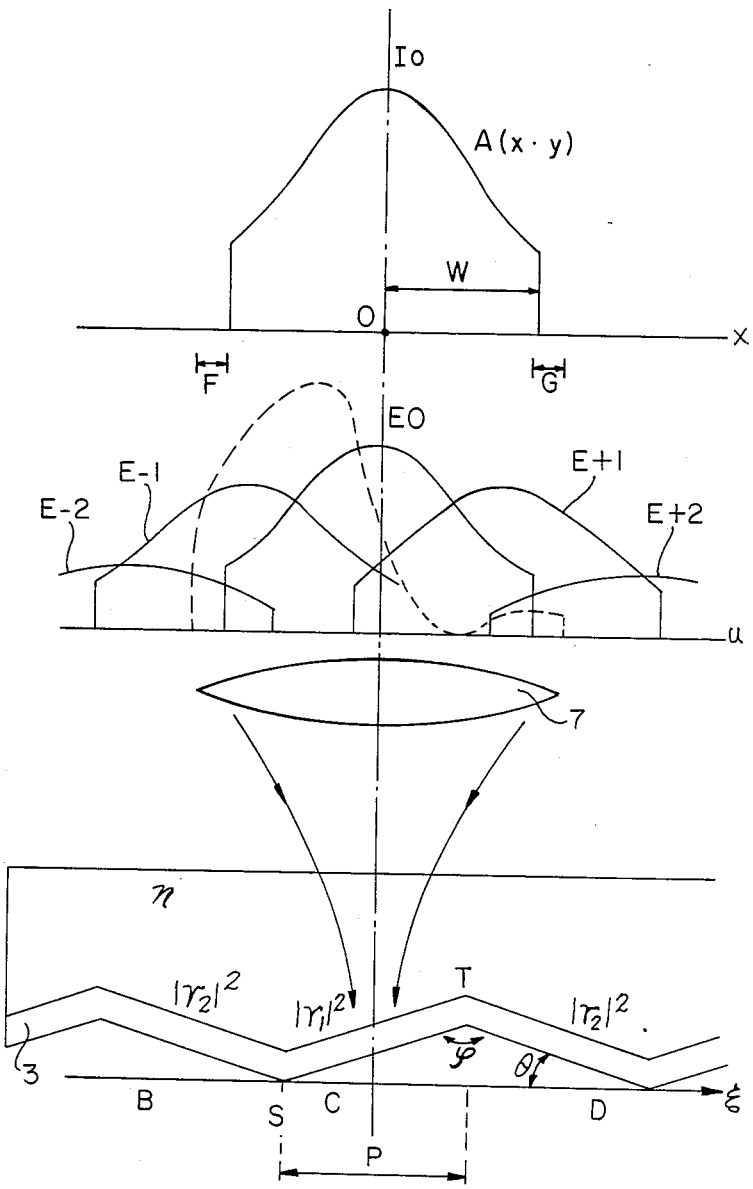
FIG. 4 is a view used to explain the reflection of light from a V-shaped groove.

The electric field U (u,v) of the reflected light is expressed from Eqs. (1) and (3) by $$\alpha r_1 + \beta r_2$$

and the intensity of light $$X r_1^2 + Y r_1 r_2 + Z r_2^2 \quad (4)$$

where $\alpha$ and $\beta$ are complex numbers while X, Y and Z are real numbers, all of which are the functions of u and v. The integration of the intensity of light over a predetermined surface area results in the quantity of the light which is received. In FIG. 4 the broken curve shows the approximate distribution of the intensity of the reflected light passing through the lens 7 while the solid-line curves indicate the approximate distributions of the intensity of the diffracted light beams when $r_1 = r_2$.

From the above discussion, it becomes apparent that the $(-1)$-st diffracted light beam contains the information recorded only on the sloped surface C and that if the diffracted light beams centered around the $(-1)$-st are mainly received for the reproduction of the video information on the sloped surface C, the crosstalk from the sloped surfaces B and D can be reduced to a small level.

Figure 6:
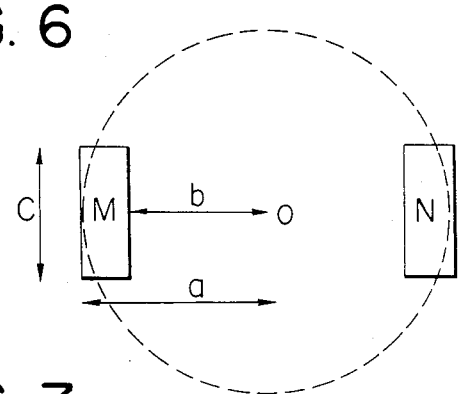
FIG. 6 is a top view of a photodetector.

For instance, assuming that a photosensor comprising at least two units M and N as shown in FIG. 6 are located in the path of the reflected light beam in such a way that the lines which pass through the centers of the two units M and N are in parallel with the projection of the u-axis on the surface of the photosensor and are symmetrical with each other about the center O of the projected image over the surface of the photosensor of the lens 7 (the dotted circle). In the case of the reproduction of the video information on the sloped surface C, the $(-1)$-st diffracted light beam is received by the unit M, but in the case of the reproduction of the sloped surface B or D, the $(+1)$-st diffracted light beam is received by the unit N. Then, the crosstalk between the sloped surface C and the sloped surface B or D can be reduced to a small level.

Since the 0-th diffracted light beam contains the video information on the sloped surfaces B and D, it is preferable to avoid the mutual interference between the $(-1)$-st diffracted beam and the 0-th diffracted beam so that the crosstalk can be reduced to a minimum level. If the incident light beam $I_o$ falls over the whole surface of the lens 7, the distribution of the reflected light beam is the same as that of the incident light beam so that the interference of all the diffracted light beams which pass through the lens 7 with the 0-th order reflected diffracted light beam will occur. Therefore, if the incidence of the light beam $I_o$ to the portion adjacent to the outer rim of the lens 7 is avoided, the 0-th reflected light beam can be prevented from passing through this peripheral portion. Therefore, it suffices to receive the light beam reflected to the peripheral portion of the lens. That is, the light beams reflected from the portions F and G in FIG. 4 where no incident light beam $I_o$ falls contains only a small quantity of crosstalk components in the ($-2$)-nd diffracted light beam. In order to provide an optimum optical system with a minimum crosstalk, the magnification of the passage of the reflected light beam is so determined that the ($\pm 1$)-st diffracted light beam containing a small cross talk component of the ($\pm 2$)-nd diffracted beam from the peripheral portion of the projected image of the lens are mainly directed on the photosensor unit M or N as described above.

The track pitch P is one half of the conventional one. The diameter of the spot of the light beam is in proportion to $\lambda/NA$. Many attempts have been made to narrow the track pitch, but because of the problem of crosstalk there exist the limits to the reduction in track pitch. The track pitch is in proportion to the diameter of a spot of light beam. Therefore, the track pitch 2P of the conventional optical video disk as well as the track pitch P of the optical video disk embodying the present invention are dependent on the wavelength of a laser beam used and the effective NA (numerical aperture) of a lens. The wavelength of a laser beam which can be used in practice ranges from 0.63 to 0.85 μm and it is preferable that NA be greater than 0.40, the upper limit being 0.6. If NA is in excess of 0.6, aberrations due to the nonuniformity in thickness of a lens blank will be much enhanced. According to the conventional optical recording and reproducing system, pictures with satisfactory qualities can be reproduced from an optical video disk with a track pitch of 1.67 μm by the combination of the laser beam of a wavelength of 0.63 μm and a lens with NA of 0.40. Therefore, the reference values are as follows:

$$2P = 1.67 \, \mu m$$

$$\lambda = 0.63 \, \mu m, \text{ and}$$

$$NA = 0.40$$

Then, the following relationship is established:

$$2P = 1.06(\lambda/NA)$$

The laser beam is transmitted through the resin substrate and is incident on the sloped surface of the V-shaped groove. The resin substrate has a refraction index n of 1.5. Therefore, the slope angle $\theta$ (see FIG. 4) is given from Eq. (2) by $$\tan \theta = 0.31 NA$$

Substituting the value of NA from 0.40 to 0.60, we have ti $7.1° < \theta < 10.5°$ (5)

The angle $\phi$ between the adjacent sloped of the V-shaped grooves is, therefore, $$159° < \phi < 166° \quad (5')$$

In some cases, the laser beam is incident on the sloped surface of the V-shaped groove through the air when the laser beam is directed from the above in FIG. 1. The index of refraction of the air is 1. Therefore, $$10.6° < \theta < 15.7° \quad (6)$$

and $$149° < \phi < 159° \quad (6')$$

A practical example will be considered. The lens with NA of 0.6 and the semiconductor laser source generating the laser beam of the wavelength 0.78 μm are used. The laser rays are transmitted substantially in parallel with the axis of the lens and the light flux whose intensity is higher than 1/e of the intensity of light at the center of the laser beam is made incident on the center portion of the surface of the lens which corresponds to NA of 0.5. The reflected laser beam is received by the photosensor unit M which is so located as to satisfy the following relationships (See FIG. 6):

$$a = R, \text{ and}$$

$$b = c = 0.75R$$

where R is the radius of the image of the lens projected. With $\lambda = 0.78$ μm and $NA = 0.5$, the track pitch 2P which is used the conventional optical recording and reproducing system is 1.65 μm. Therefore, according to the present invention, the track pitch P becomes about 0.83 μm. And the slope angle $\theta$ is 8.9° from Eq. (2). In this case, the reproduced signal S has the value equal to the value obtained by the integration of Eq. (4) over the domain M in FIG. 6 and is $$S = r_1^2 - 0.05 r_1 r_2 + 0.02 r_2^2 \quad (7)$$

Figure 7:
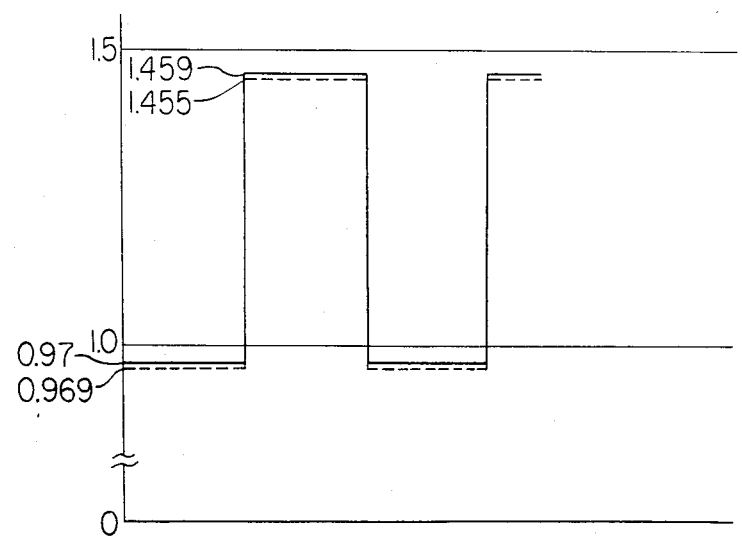
FIG. 7 shows a waveform of the output derived from one of the unit cells of the photodetector shown in FIG. 6.

It is assumed, for instance, that the recorded portions; that is, the pits 4 (See FIG. 1) has a reflectivity of 1.5 and the unrecorded portion, 1.0. Then the values of $r_1^2$ and $r_2^2$ vary in time from 1.0 to 1.5 stepwise and periodically. The waveform of the reproduced signal derived from the photo sensor unit M is shown in FIG. 7. The solid-line waveform is that of the signal reproduced from the sloped surface C when no video information is recorded on the sloped surfaces B and D and the broken-line waveform is that of the signal reproduced from the sloped surface C when the video information same as that recorded on the sloped surface C is also recorded on the sloped surfaces B and C. From FIG. 7, it is seen that the crosstalk component is very small.

Figure 8:
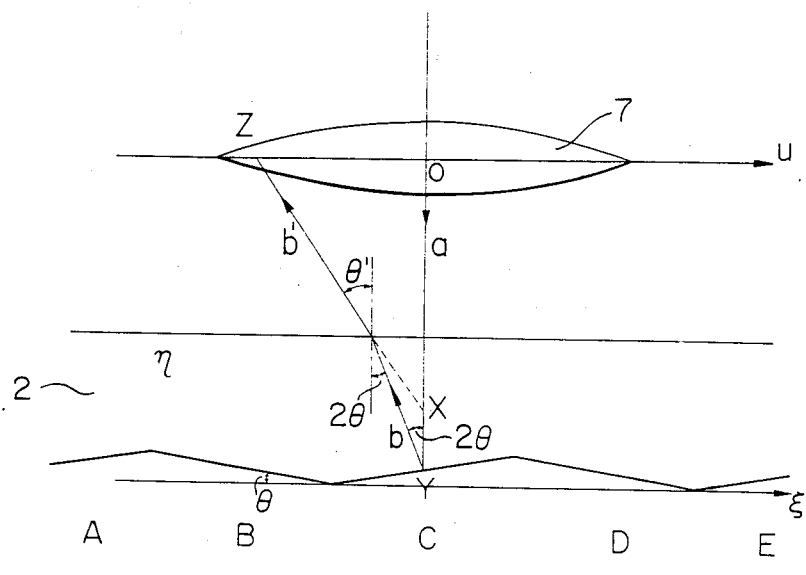
FIG. 8, consisting of A-E, is a view used to explain the reflection of the light beam from the optical storage disk from the standpoint of geometrical optics for the sake of explanation made with reference to FIG. 4.
Figure 8:
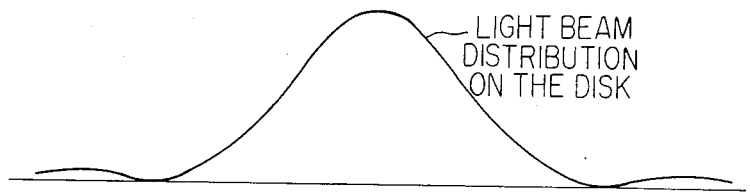

The underlying principle of the present invention may be more easily understood with the aid of the geometrical optics. Referring to FIG. 8, the light ray a which passed the center of the lens 7 is reflected by the sloped surface C with the slope angle of $\theta$ in the direction b which makes an angle $2\theta$ with the incident light ray a and is refracted at the boundary between the substrate 2 with the index of refraction n and the air in the direction b'. The reflected and refracted light ray reaches the point Z on the uv plane. Therefore, the information stored at the point of reflection on the sloped surface C is contained in the reflected and refracted light ray which is incident at the point Z. If the index of refraction of the substrate 2 is 1.5, the distance between X and Y is equal to one third (⅓) of the thickness of the substrate 2 which is shorter than the focal length f ($=\overline{OY}$) of the lens 7. For instance, if the thickness is 1.2 mm, $\overline{XY} = 0.4$ mm, which is about 10% of the focal length $f = 4 \sim 5$ mm of the lens 7. Therefore, the following approximation may be held:

$$OZ = OX \tan \theta' = f\theta'$$

From the law of refraction, $$\theta' = n \cdot 2\theta$$

Therefore, $$OZ = 2fn\theta$$

It follows, therefore, that if the center of (31 1)-st reflected diffracted light beam reaches at the point Z; that is, if $\overline{OZ} = \lambda f/2P$, $\theta = \lambda/4P\,n$, which is equal to Eq. (2). The ray of light incident on the sloped surface B or D is reflected and refracted and reaches a point which is in point-to-point symmetrical relationship with the point Z with respect to the center O of the lens 7. Thus, if Eq. (2) is satisfied, the information stored at the point of incidence on the sloped surface C is read out and transmitted to the point Z at which the center of (−1)-st diffracted light beam reaches. The reflection from the sloped surface A or E must be also taken into consideration. In FIG. 8 is also shown the distribution of the intensity of the light beam focused over the optical video disk with respect to the V-shaped grooves thereof. It is seen that the intensities of light rays incident on the sloped surfaces A and E are low and negligible. This means that if the conventional flat optical video disk with the track pitch 2P is used, the crosstalk can be reduced to a minimum level.

Figure 1B:
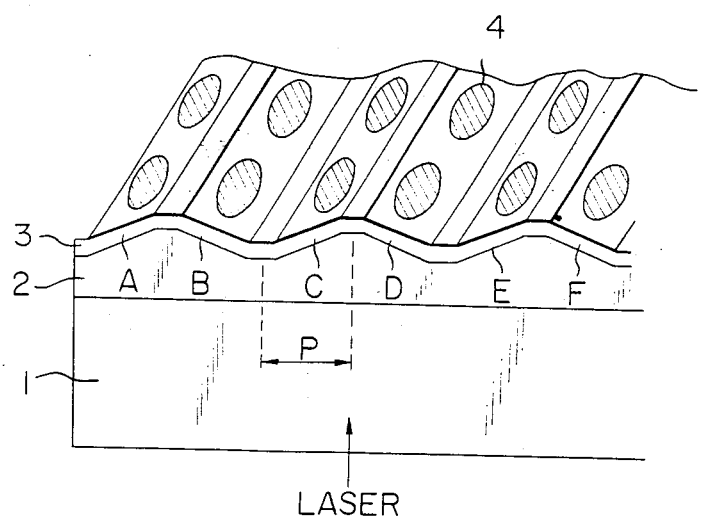
Figure 9:
FIG. 9 shows V-shaped grooves which are rounded at the crests and bottom lands.

So far, the reflectivity of the optically unrecorded and recorded areas have been considered as being uniform widthwise of the sloped surfaces of the V-shaped grooves. However, the commercially available optical video disks have bit "holes" with a width of about 0.4 μm. Since the bit on a thin recording film such as TeOX is thermally recorded, a suitable combination of the intensity distribution of the spot focused on a thin recording film and the power of the laser beam can easily form bit areas with the width of about 0.6 μm. In practice, as shown in FIG. 1, only a bit area or pit 4 with a limited width has its reflectivity changed when the spot of the laser beam is focused and the reflectivity of the unrecorded area adjacent to the crest and bottom of the V-shaped groove remains unchanged. That is, no video information is recorded over this area. The slope angle θ is one of the very important design factors in the design and fabrication of the optical video disk and the optical recording-and-reproducing system embodying the present invention, but the local configurations of the crest and bottom of the V-shaped or otherwise-shaped groove are not. Therefore, it is not needed that the cross sectional configuration of the recording groove be strictly in the form of a V. To put into another way, the crest and bottom of the V-shaped groove can be rounded as shown in FIG. 9. In addition, the groove can have a cross sectional configuration of an inverted trapezoid with a flattened crest and a flattened bottom as shown in FIGS. 1B, 2B and 3B. The width of the slope face of the inverted-trapezoid-shaped groove; that is, the spacing between the crest and the bottom land must be limited depending upon the width of a pit 4. That is, if the crest and bottom land are too great in width, the recording density is inevitably decreased. Therefore, the widths of the crest and bottom lands must be smaller than that of the slope face.

Figure 10:
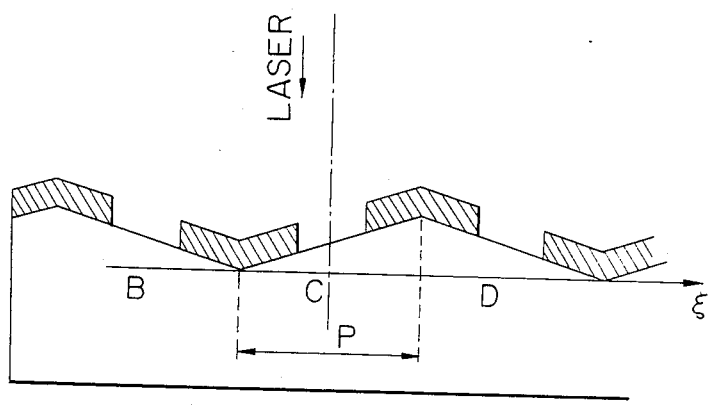
FIG. 10 is a view used to explain the recording of information by local evaporation of a thin metal film deposited over the side walls of the V-shaped grooves of an optical storage disk.

So far, the pits 4 have been described as having only a reflectivity and a transmittance which are different from the unrecorded area surrounding them so that the complex reflectivity $r_1$ and $r_2$ which have been explained with reference to FIG. 4 are treated as real numbers. However, video information can be stored also by local evaporation of a thin recording metal film as shown in FIG. 10. If the pit or hole and the unrecorded area surrounding it have the same reflectivity $r_o$, the reflectivity can be expressed by the following function $$r = r_o \exp(2\,ikd)$$

that is, by a complex number. However, from Eq. (3) it is apparent that the (−1)-st diffracted light beam contains only the video information recorded on the sloped surface C. Therefore, according to the present invention, regardless of the fact whether the video information is recorded in the form of a pit whose optical properties such as reflectivity has been changed or in the form of an evaporated hole or the like, the crosstalk problem can be handled equally. It follows, therefore, that according to the present invention the track pitch can be reduced to one half as compared with the prior art optical video disk even when the video information is recorded in the form of an evaporated hole in the metal thin film. As a result, the present invention can remarkably increase the recording density.

Figure 11:
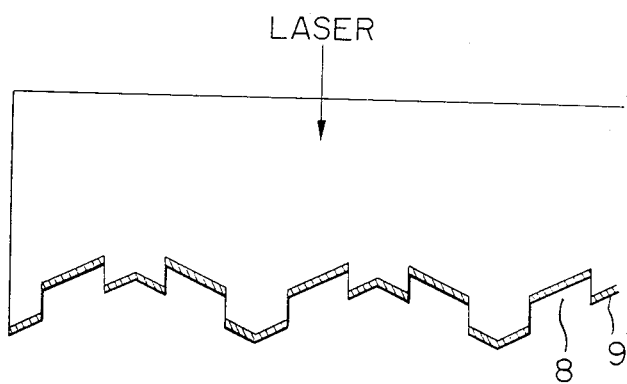
FIG. 11 is a partial cross sectional view of a prerecorded optical storage disk in which the information is stored in terms of the presence and absence of "hole" pits.

Next, the increase in recording density for prerecorded optical video disks will be described. The high density prerecorded optical video disks shown in FIG. 11 have the hole pit 8 on the sloped and reflecting layer 9 on the surface of disk for increasing the reflected light intensity. The reproduction system of the optical video disks of FIG. 11 is same as that of FIG. 10. The difference of those disks is only the sign of the difference in phase of the light reflected from the pit.

The process for fabricating the optical video disk having the cross sectional configuration as shown in FIG. 11 will be described. A thin recording film of As—Te or Se—Ge is deposited or otherwise formed. The laser evaporation technique is used in the case of the thin film of As—Te to burn holes, but in the case of the thin film of Se—Ge, the photolithographic technique (See Appl. Phys. Lett. Vol. 29, page 877, 1976) is used. Thus, the master or mother disk as shown in FIG. 10 is prepared. Stampers are prepared from the mother disk by a conventional process. With a stamper, prerecorded optical video disks are pressed. As shown in FIG. 11, the optical video disk has aluminum reflecting layers 9 which are formed by the vacuum evaporation or sputtering process. The optical video disk has a long recording time. For instance, when an optical video disk with a diameter of 30 cm is rotated at the same angular velocity at which "trick" reproduction is effected, the total reproducing time of both sides is two hours and if the disk is rotated at the same linear velocity, the moving picture can be displayed for four hours.

Figure 12A:
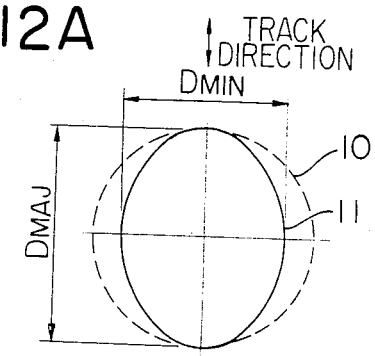
FIGS. 12A to 12C are views used to explain the incidence on the surface of a lens of a laser beam having an elliptical cross sectional configuration.
Figure 12B:
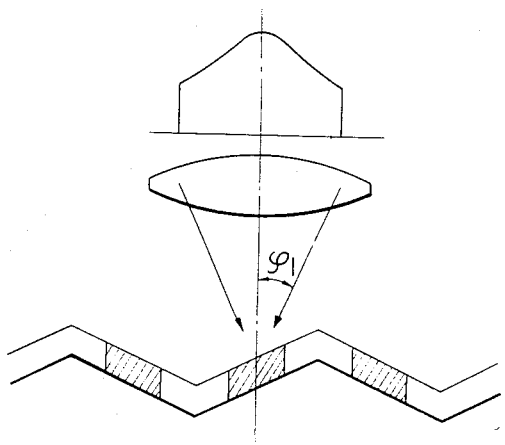
Figure 12C:
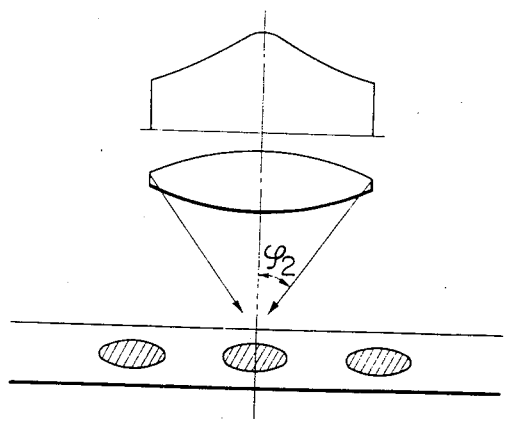
Figure 13:
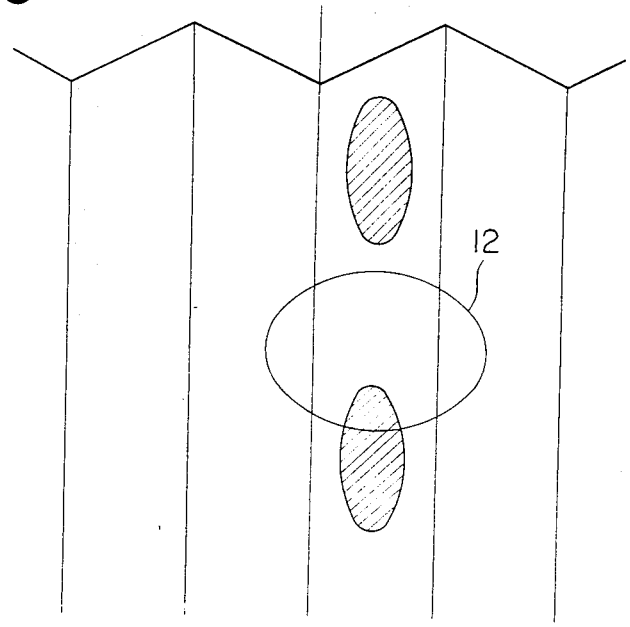
FIG. 13 shows the spot of the laser beam which has passed the lens as shown in FIGS. 12A to 12C and focused upon a recording track of an optical storage disk.
Figure 14:
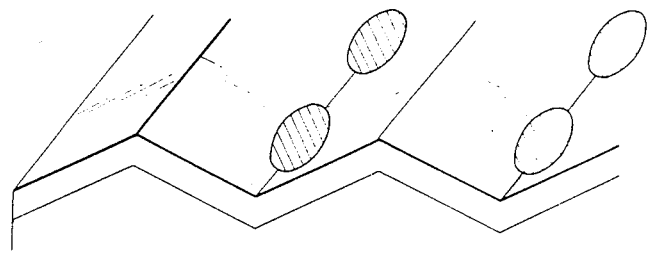
FIGS. 14 and 15A-D are views of used to explain the recording on an optical storage disk with V-shaped grooves.

The diameter of the spot of the laser beam focused upon the optical video disk is almost in inverse proportion to the numerical aperture NA of a lens. Sharp focusing can be attained if the laser beam uniformly falls over the whole surface of the lens and if the lens has a large NA. So far, the laser beam has been described as being prevented from falling on the peripheral portion adjacent to the rim of the lens. This means that the numerical aperture NA of the lens is not efficiently used. In order to avoid the interference between the (±1)-st reflected-and-diffracted light beams with the zero order as much as possible, the laser beam must be so controlled that it will not be incident along the whole width of the lens in the direction perpendicular to the tracks of the disk, but it may be incident along the whole length of the lens in the direction in parallel with the tracks as shown in FIG. 12A. In the same figure, the broken-line curve indicates the rim of the lens and the laser beam is the form of an ellipse 11. The intensities of rays of light incident outside of the ellipse 11 are very low. From FIG. 12B it is seen that the effective numerical aperture $NA_1$ of the lens in the direction perpendicular to the track is $\sin \phi_1$ while that in the direction in parallel with the track is $NA_2 = \sin \phi_2$ as shown in FIG. 12C. And $NA_2 > NA_1$. As described previously, the diameter of the spot of the laser beam focused on the optical video disk is almost in inverse proportion of the numerical aperture NA of a lens so that the diameter of the laser beam spot in the direction in parallel with the track is about ($NA_1/NA_2$) of the diameter in the direction perpendicular to the track as shown in FIG. 13. The ellipse 12 of the focused spot of the laser beam has the intensity equal to about $1/e$ of the intensity of light at the center.

Since the diameter of the laser spot in the direction perpendicular to the track can be selected to being same as the case described in FIG. 4, the crosstalk can be reduced to a minimum level. However, with the elliptical laser incidence, the spot diameter in the parallel direction with the track can be made smaller than that in the perpendicular direction or that in FIG. 4, so that the frequency characteristics of the reproduction can be improved. More specifically, if a laser beam 0.63 μm in wavelength is focused through a lens with the numerical aperture NA of 0.4 to scan a track at a radius of 55 mm of a commercially available optical video disk which is spinning at the rate of 1800 rpm, the NTSC television signal at a maximum frequency of 13 MHz can be reproduced with a satisfactory signal-to-noise (S/N) ratio. This means that pits or holes with the length greater than 0.4 μm can be discriminated or distinguished. If the outermost track, which bears the video information, of the disk is 145 mm in radius, the reproduction of moving picture from each side can last 60 minutes according to the present invention. In order to improve the frequency characteristic, a lens with a numerical aperture NA of 0.6 is used and a laser beam flux of elliptical cross section is derived to the surface of the lens in such a way that the major axis $D_{major}$ of the elliptical spot 11 is equal in length to the diameter of the lens 10 and the minor axis $D_{minor}$ which is perpendicular to the track is equal in length to the diameter of the lens with the numerical aperture NA of 0.4 as shown in FIG. 12. Therefore, the length of the minor axis $D_{minor}$ of the laser spot focused on the disk becomes about ⅔ of that of the major axis $D_{max}$. Then, pits or holes with a length greater than 0.27 μm can be distinguished from each other. This means that the television signal stored along the track of a radius of 37 mm can be reproduced. More specifically, a 60-minute program of moving picture can be recorded on one side of an optical video disk of a diameter of only 26 cm and can be reproduced in various modes.

So far, it has been assumed that an optical read/write head be so controlled that the spot of a laser beam can track or scan each slope face of V-shaped pregrooved tracks of the optical video disk.

Figure 15:
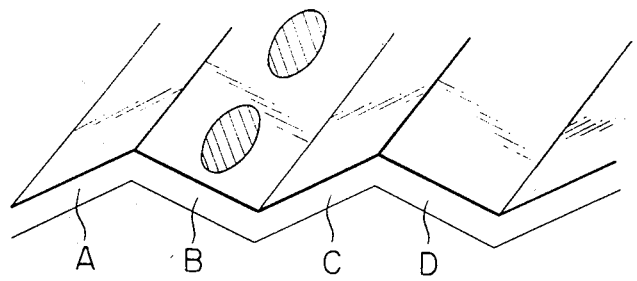

The laser spot focused on the disks can be traced along the crest T or bottom S by controlling the intensity distribution of reflected light from the disk to be symmetry with respect to the parallel direction of track. This method is well known as the far-field tracking one. The information can be recorded or reproduced along the crest or bottom with the laser spot tracing therealong. The laser spot can also be traced along the center line of the sloped of the V-groove by deviating the intensity distribution of reflected light from the disk intentionally from the symmetry distribution. It is apparent that in the case of writing on and reading out from the sloped surface C, there exists the difference in the distribution of the intensity of the reflected light beam between the time when the video information is not recorded on the sloped surface B and the time when the sloped surface B has been already formed with bit patterns or pits as shown in FIG. 15. That is, if the video information has been already stored on the sloped surface B when further video information is to be recorded on the opposing sloped surface C, it becomes impossible to track or scan the sloped surface C along the center line thereof. To put into another way, the tracking of the sloped surface C in either the recording or reproduction mode is considerably affected if the video information has been already recorded on the adjacent sloped surface B or D. That is, the tracking control is much disturbed. According to the present invention in order that each sloped surface can be correctly tracked regardless of the adjacent sloped surface being recorded or not, the tracking signal at a frequency different from that of the video information signal is previously recorded in the pregrooved tracks, which are in the form of a V or an inverted trapezoid in cross section, so that the tracking signal can be detected in terms of the variations in the intensity of the reflected light as will be described in detail below.

Figure 16:
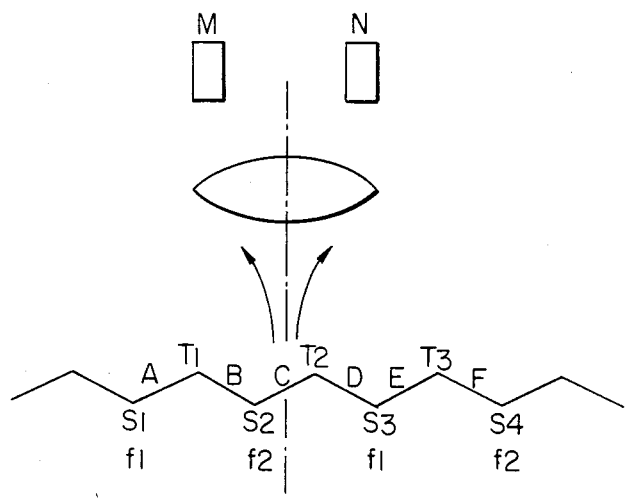
FIGS. 16A and 16B are views used to explain a first tracking control means.

A first tracking means will be described. Referring to FIG. 16, each of the odd-numbered grooves $S_1, S_3, \ldots$ is formed with changing the depth of the V-groove with a period of frequency $f_1$ in the parallel direction of the groove and the amplitude of the depth change of groove may be very small and, for instance, 0.01 μm. In like manner, the depth of each of the even-numbered grooves $S_2, S_4, \ldots$ and so on is periodically varied with a period or frequency $f_2$ which is different from the period or frequency $f_1$. As a result, the phase of the reflected-and-diffracted light beam varies and the intensity of the reflected light beam also varies. The periods or frequencies $f_1$ and $f_2$ are lower than the frequency of the video signal.

Figure 17:
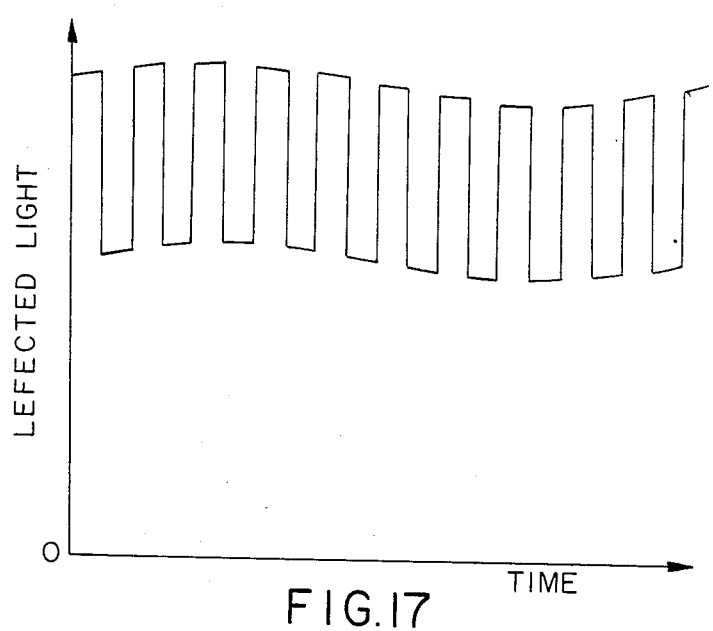
FIG. 17 shows the variation in the intensity of reflected light with respect to time.

The first unit M of the photosensor mainly receives the reflected light beam whose intensity varies at the frequency $f_2$ when the sloped surface C is being tracked while the second unit N receives the reflected light beam whose intensity varies at various combinations of the frequencies $f_1$ and $f_2$. The change in time in intensity of the reflected light beam received by the first sensor unit M is shown in FIG. 17. If the output signal component at the frequency $f_2$ which is derived from the first sensor unit M is compared with the output signal component of the same frequency; that is, $f_2$ derived from the second sensor unit N, the former is by far greater in amplitude than the latter. Therefore, the output signal at the frequency $f_2$ from the second sensor unit N is amplified at an amplification factor higher than that of the output signal of the same frequency $f_2$ from the first sensor unit M so that the tracking signal can be generated. Briefly stated, a tracking control circuit controls an optical write/read head in such a way that the amplified output signal from the first detector M becomes equal to the amplified output signal from the second sensor unit N. In other words, the respective amplifications factors for the output signals from the first and second sensor units M and N are so selected that the spot of the laser beam can track or scan the sloped surface C along the center line thereof. The amplifications factors are apparently dependent upon the cross sectional configurations of V-shaped grooves, the optical system employed and filter circuits which are employed to select specific signals at predetermined frequencies.

Figure 18:
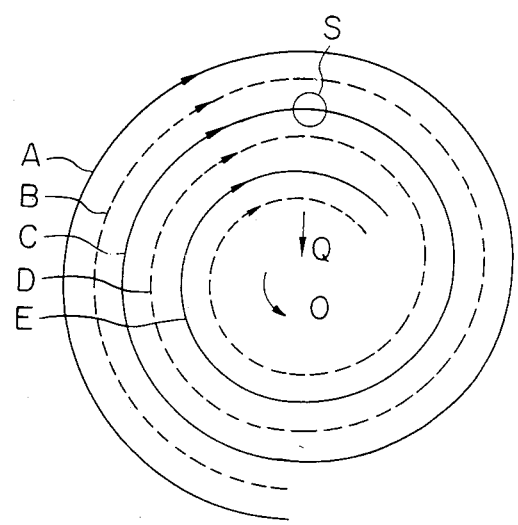
FIG. 18 consisting of A-E are schematic top views of a spiral recording groove of an optical storage disk embodying the present invention.

After one complete tracking of the sloped surface C, that is, after one rotation of the optical video disk, the spot of the laser beam shifts from the sloped surface C to the sloped surface E, not D as shown in FIG. 18. Therefore, after every complete rotation of the optical video disk, the spot of the laser beam is shifted by one pitch P in the direction opposite to the direction Q in which the spot of the laser beam moves relative to the center of rotating optical video disk. When the sloped surface D is tracked, the output signal components at the frequency $f_1$ are derived from the first and second sensor units M and N and the output from the first sensor unit M is amplified at an amplification factor higher than that for the amplification of the output signal from the second sensor unit N.

Four tracking controls can be attained by the combinations of a method for extracting the output signal components at the frequency $f_1$ or $f_2$ and a method for selecting the amplification factors for the amplification of the outputs from the first and second sensor units M and N (that is, the factor for the amplification of the output signal from the first sensor unit M is higher or lower than that for the amplification of the output signal from the second sensor unit N). If the spot of the laser beam S is shifted radially by one pitch P every time when the optical video disk makes one complete rotation and the above-described four tracking controls are employed sequentially, the spot of the laser beam can be smoothly and continuously track the sloped surfaces in the order of A, B, C, D and E in FIG. 18.

Next, a second tracking control means will be described. Each of the bottom lands is formed with a linear array of pits at a period of frequency $f_1$ and each pit exhibits optical properties different from those of the unrecorded portion or area surrounding it. For instance, the pits may be holes so that the light rays reflected from the holes are out of phase with the light rays reflected from the unrecorded portion. Alternatively, the pits may have a reflectivity or transmittance different from that of the unrecorded portion. In like manner, each of the crest lands is formed with a linear array of physical or optical pits at a period or frequency $f_2$. Therefore, the light beam reflected from the optical video disk contains the two frequencies $f_1$ and $f_2$. As with the first tracking control means, the spot of the laser beam is steered to track each sloped surface of the pregrooved tracks in such a way that the magnitudes or values of the output components of the frequencies $f_1$ and $f_2$ become equal.

Figure 19:
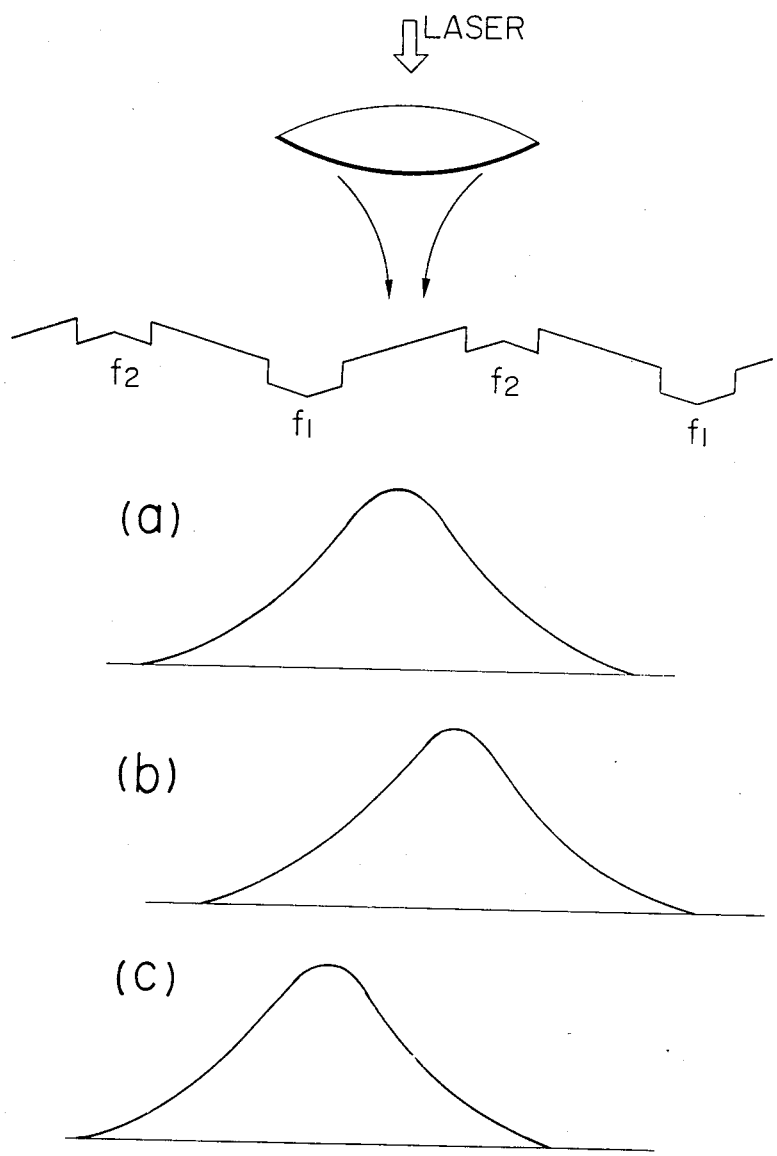
FIGS. 19, (a)-(c), is a view used to explain a second tracking control means.

The second tracking control means will be described in more detail in conjunction with the V-shaped grooves with reference to FIG. 19. As described previously, the trains or arrays of tracking control pits of the periods or frequencies $f_1$ and $f_2$ are recorded on the bottom and crest lands, respectively. The pits shown in FIG. 19 are in the form of a hole. FIGS. 19(a), (b) and (c) show the distributions of the intensity of the laser beam focused upon the optical video disk. For instance, if the spot of the laser beam focused on a sloped surface is deviated toward the crest from the center line of the sloped, the intensity distribution becomes as shown at (b). Then the light ray reflected from the crest with the tracking control pit train of the frequency $f_2$ is higher in intensity than the light ray reflected from the bottom bearing the tracking control pit train of the frequency $f_1$. As a result, the variations in intensity of light at the frequency $f_2$ become greater than those in optical intensity at the frequency $f_1$. On the other hand, if the spot of the laser beam is deviated toward the bottom from the center line, the optical intensity distribution becomes as shown at (c). Then variations in optical intensity at the frequency $f_1$ become greater than those at the frequency $f_2$. However, when the spot of the laser beam is tracking correctly the center line, the optical intensity distribution becomes as shown at (a). Then, variations in optical intensity at both the frequencies $f_1$ and $f_2$ become equal. Thus, if the spot of the laser beam is controlled in such a way that the variations in optical intensity at the frequencies $f_1$ and $f_2$ become equal, the spot of the laser beam is accurately tracking the sloped surface along its center line.

Figure 20:
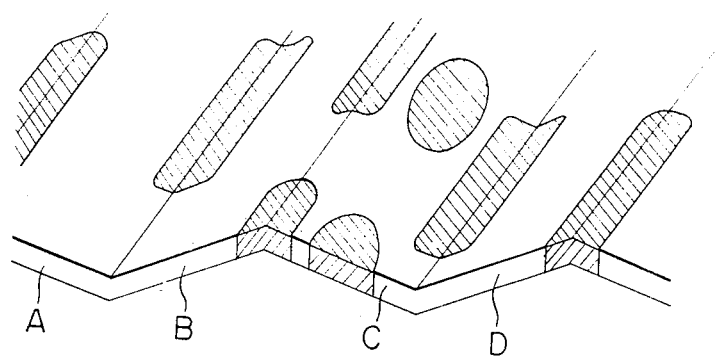
FIGS. 20 A-D 21 and 21, each consisting of A-D, are views used to explain the recording in the V-shaped recording grooves with the second tracking control means shown in FIG. 19.

Next, the process for pre-recording such tracking control pit trains or arrays as described above will be described. As described previously, a diamond stylus having a V-shaped or a trapezoid-shaped point is used to cut or rule V-shaped or inverted-trapezoid-shaped grooves in the flat mirror surface of a blank original disk. In the case of the optical video disk of the type in which the optical properties such as reflectivity or transmittance of the pits are changed from those of the unrecorded portion as described previously, the master, the mother and the stampers are prepared from the original in a conventional manner and disk substrates 1 (See FIG. 1) are stamped with the stampers. As described previously, a thin film of a lower tellurium oxide is deposited over the substrate 1 by the vacuum evaporation process. Thereafter, the bottom and crest lands are recorded with the tracking control pit trains by the spot of the laser beam. The pits, thus, recorded have the optical properties changed from those of the unrecorded portion. With such tracking control pit trains, the accurate tracking can be ensured and consequently information can be stored at a higher degree of density. FIG. 20 shows the optical video disk fabricated in the manner described above. Information is shown as being recorded on the sloped surface C.

Figure 21A:
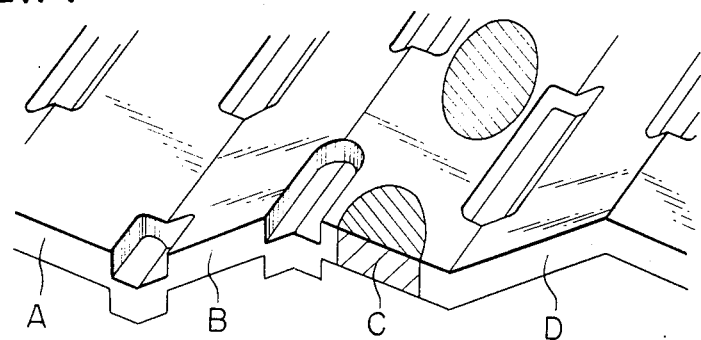
Figure 21B:
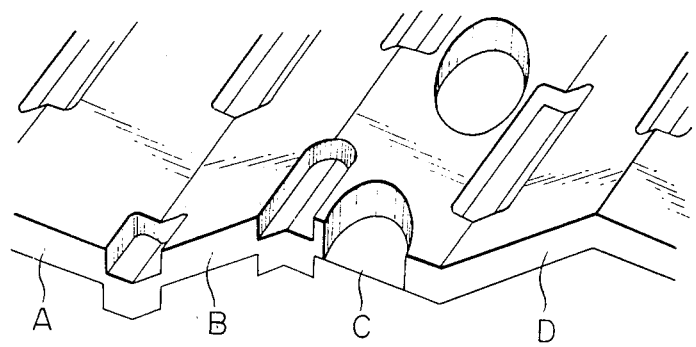

The tracking control pits in the form of holes can be fabricated by the processes described previously. That is, in the case of the optical video disk with a thin film of a metal such as tellurium, the laser beam evaporation technique can be used. In addition, the conventional photolithographic techniques can be employed. The tracking control "hole" pit trains can be formed on the pregrooved original, stampers or replicas. The pregrooved disk which is now formed with the tracking control hole pit trains along the bottom and crest lands is used as an original for stamping disk substrates 1 (See FIG. 1). A thin recording film 3 (See FIG. 1) is deposited over the substrate 1. The side wall surfaces of the V-shaped or inverted-trapezoid-shaped grooves are tracked for recording and reproduction in the manner described above. When tellurium suboxide is used for depositing the thin recording film, the information is recorded in terms of the difference in optical properties between the pits and the unrecorded portion on the sloped surface of the pregrooved track as shown in FIG. 21A. When the thin recording film is made of the deposition of tellurium or its alloy, information is recorded in terms of the presence and absence of holes; that is, the hole pits as with the tracking control pit trains as shown in FIG. 21B.

The disk which has the trains or tracks of track controlling pits and information pits, both of which are in the form of holes, can be used as an original for stamping replay-only optical video disks with a high storage density. Such replay-only optical video disks can be stamped with an original on which the tracking control pits and the information pits are recorded or formed simultaneously. A thin recording film of a metal or an inorganic photoresist is formed over the surface of a disk with V-shaped grooves. Two recording light beams which can be modulated independently with each other are simultaneously focused over the disk. One laser beam tracks the crest and bottom lands to record the tracking control pits while the other laser beam scans the side wall surfaces of the V-shaped grooves to record the information pits.

Figure 22:
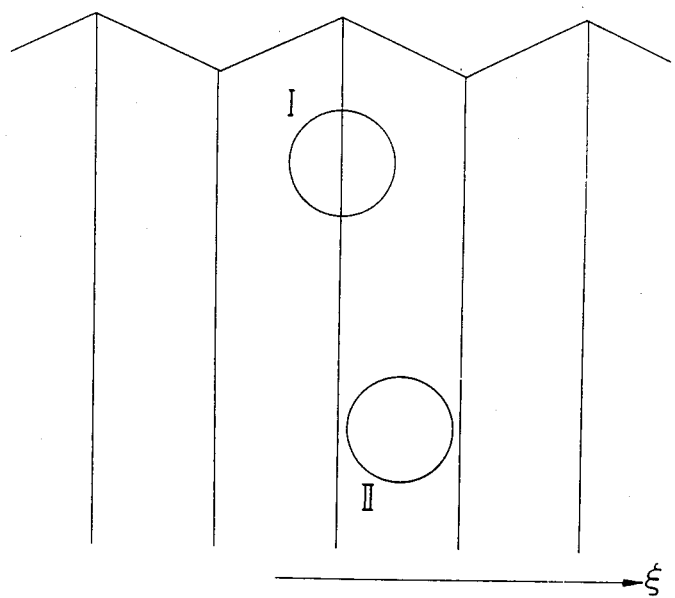
FIG. 22 is a view used to explain the simultaneous recording of tracking control signals and information signals with two laser beams and shows the positions of the spots of the laser beams focused on an optical storage disk.

The optical system for generating the two light beams is so designed and constructed and mounted that the distance between the spots of the light beams focused on the optical video disk can be correctly maintained constant all the time. The radial distance is an odd-number multiple of one quarter of the pitch of the V-shaped grooves; that is, the distance between the adjacent crests. The circumferential distance between the spots is selected a few times the wavelength of the laser beam in order to prevent the increase in optical intensity at the areas at which two stops of the laser beams overlap with each other. FIG. 22 shows two spots of laser beams focused on an optical video disk. The spot I is used for recording the tracking control pits and is shown as tracking the crest of a V-shaped groove and the spot II is used for recording information pits and is spaced apart from spot I by a distance equal to one half of the pitch P in the radial direction indicated by the arrow $\xi$.

So far, the first and second tracking control means have been described in detail in conjunction with the V-shaped groove, but it is to be understood that they can be equally applied when the optical video disk has grooves which are in the form of an inverted trapezoid in cross section.

In summary, according to the present invention, the spot of a laser beam is made to track or scan the sloped faces of V-shaped or inverted-trapezoid-shaped grooves (which are V-shaped or inverted-trapezoid-shaped in cross section when taken along a plane which passes the center of a disk and is perpendicular to the surface thereof) for recording or reproducing information. As a result, the present invention can increase the storage capacity twice as much as that of the conventional optical video disk.

What is claimed is:

1. An optical disk recording and reproducing system of the type in which information is recorded or reproduced with a light beam which is focused on an optical disk, said system comprising:
   an optical disk comprising a substrate of index of refraction n having radially adjacent grooves on at least one surface thereof,
   each of said grooves having a V-shaped or inverted-trapezoid-shaped cross-section in the radial direction of said disk, with two major sloped side walls each inclined at an angle $\theta$ with respect to said substrate surface,
   each of said side walls constituting a track of pitch p upon which optically discernible information may be recorded or from which optically discernible information may be reproduced by irradiation of said track with a light beam,
   each of said grooves having an optical depth d defined by the relation $d = n\, p\, \tan\theta$; and
   means for focusing a light beam through said substrate onto a given track of said optical disk and for causing said light beam to scan said given track;
   the optical depth of the groove containing said given track being about one-quarter of the wavelength of said light beam.

2. An optical disk recording and reproducing system of the type in which information is recorded or reproduced with a light beam which is focused on an optical disk, said system comprising:
   an optical disk comprising a substrate having radially adjacent grooves on at least one surface thereof,
   each of said grooves having a V-shaped or inverted-trapezoid-shaped cross-section in the radial direction of said disk, with two major sloped side walls each inclined at an angle $\theta$ with respect to said substrate surface,
   each of said side walls constituting a track of pitch p upon which optically discernible information may be recorded or from which optically discernible information may be reproduced by irradiation of said track with a light beam; and
   optical control means for projecting a light beam through a transparent medium of index of refraction n which is in contact with said grooves, for focusing said light beam onto a given track of said optical disk, and for causing said light beam to scan said given track;
   each of said grooves having an optical depth d defined by the relation $d = n\, p\, \tan\theta$;
   the optical depth of the groove containing said given track being about one-quarter of the wavelength of said light beam.

3. An optical disk recording and reproducing system as set forth in claim 1 or 2, wherein said optical control means includes a lens which focuses said light beam on said optical disk, the diameter of the cross section of said light beam at least in the radial direction of said optical disk being smaller than the diameter of said lens, so that the incidence of said light beam upon predetermined peripheral portions of said lens adjacent to the rim thereof can be avoided, whereby the reproduction of the recorded information can be carried out by detecting the variations in time in the intensity of the light rays which are reflected from said optical disk and which pass mainly through the predetermined peripheral portions of said lens.

4. An optical disk recording and reproducing system as set forth in claim 3 further characterized in that a photosensor which has a first unit cell and a second unit cell is disposed in the passage of the rays of light reflected from said optical disk in such a way that said first and second unit cells are symmetrically located with respect to each other about the center of the image projected over the surface of said photodetector of said lens and the portions of the projected image of said lens corresponding to said predetermined peripheral portions thereof are substantially coincident with said first and second unit cells so that said first and second unit cells can receive the rays of light which are reflected from said optical disk and which pass through the portions of said lens which contains mainly said predetermined peripheral portions of said lens and the outputs from said first or second unit cells are used for reproduction of the stored information.

5. An optical disk recording and reproducing system as set forth in claim 1 or 2, further comprising:
means for rotating said optical disk;
means for detecting a portion of the light beam reflected from said given track of said optical disk;
the depths of said V-shaped or inverted-trapezoid-shaped grooves being varied in such a way that the detected portion of said light beam is intensity modulated at first and second frequencies during each rotation of the disk; and
means for controlling the light beam focused on said given track in response to the modulation at said first and second frequencies in the intensity of light reflected back from said optical disk, so that the spot of said light beam is caused to track along the center line of each of the side walls of said V-shaped or inverted-trapezoid-shaped grooves for recording or reproducing information.

6. An optical disk recording and reproducing system as set forth in claims 1 or 2 further characterized in that a train of tracking control pits spaced apart from each other by a predetermined first pitch or frequency is previously recorded along each of the crest lands of said V-shaped or inverted-trapezoid-shaped grooves of said optical disk, a train of tracking control pits spaced apart from each other by a predetermined second pitch or frequency is recorded along each of the bottom lands of said V-shaped or inverted-trapezoid-shaped grooves, and in the case of recording or reproduction, in responsive to the detection of the variations at said first and second frequencies in intensity of light reflected from said optical disk, the spot of said light beam is so controlled to track or scan the center line of each of the side wall surfaces of said V-shaped or inverted-trapezoid-shaped grooves of said optical disk.

7. An optical disk recording and reproducing system as set forth in claims 1 or 2 further characterized in that said V-shaped or inverted-trapezoid-shaped grooves are in the form of a spiral; and the spot of said light beam is shifted by a distance equal to the information track pitch; that is, one half of the distance between the adjacent crests of said spiral V-shaped or inverted-trapezoid-shaped groove in the direction opposite to the direction in which the spot of said light beam is shifted relative to the center of said optical disk toward the center thereof, every time when said optical disk makes one complete rotation.

8. The optical disk recording and reproducing system according to claim 1 or 2, wherein said index of refraction n is about 1.5 and the included angle between adjacent side walls of said grooves is greater than 159 degrees and less than 166 degrees.

9. The optical disk recording and reproducing system according to claim 1 or 2, wherein said optical control means includes means for causing said light beam to successively scan the tracks on the side walls of each of said grooves.

10. An optical disk as set forth in claim 9 further characterized in that the surfaces of said V-shaped or inverted-trapezoid-shaped grooves are coated or deposited with a thin film of a photosensitive recording medium.

11. An optical disk as set forth in claim 10 further characterized in that information is recorded in terms of the variations of the reflectivity or transmittance of said photosensitive recording medium caused by the exposure thereof to said spot of said light beam.

12. An optical disk as set forth in claim 10 further characterized in that information is recorded in terms of local evaporation due to the exposure to said spot of the light beam of said photosensitive recording medium.

13. An optical disk as set forth in claim 9, wherein information is prerecorded on the side walls of said V-shaped or inverted-trapezoid-shaped grooves.

14. An optical disk as set forth in claim 13 further characterized in that said information pre-recorded on each of said side walls of said V-shaped or inverted-trapezoid-shaped grooves comprises a train of raised or recessed pits; that is, a train of alternately arrayed lands and valleys, so that the light reflected back from each of the raised pits or lands is out of phase with the light reflected back from the exterior thereof; that is, the undisturbed portion.

15. An optical disk as set forth in claim 9 further characterized in that the depths of said V-shaped or inverted-trapezoid-shaped grooves are so varied that the variations in said depths alternate between a first and a second frequency every time said optical disk makes one complete rotation.

16. An optical disk as set forth in claim 9 further characterized in that a first train of tracking control pits of a first frequency is recorded along each of the crests of said V-shaped or inverted-trapezoid-shaped grooves, and a second train of tracking control pits of a second frequency is recorded along each of the bottom lands of said V-shaped or inverted-trapezoid-shaped grooves, said first and second frequencies being different from each other.

17. An optical disk as set forth in claim 16 further characterized in that the pits of said first and second trains of tracking control pits exhibit a reflexibility or a transmittance which is different from that which the portions exterior of said pits exhibit.

18. An optical disk as set forth in claim 16 further characterized in that the pits of said first and second trains of tracking control pits are in the form of a raised or recessed portion so that the light reflected from said raised or recessed portion is out of phase with the light reflected from the portion exterior thereof.

19. An optical disk as set forth in claim 16 further characterized in that first and second light beams are used which can be modulated independently of each other, and said first and second light beams are simultaneously focused on said optical disk in such a way that said first light beam records said first train of tracking control pits of said first frequency along each of said crest lands of said V-shaped or inverted-trapezoid-shaped grooves and said second train of tracking control pits of said second frequency along each of said bottom lands of said V-shaped or inverted-trapezoid-shaped grooves while said second light beam scans or tracks successively said side wall surfaces thereof to record desired information, whereby a prerecorded optical disk with information and tracking control signals prerecorded thereon is provided.

20. A method of recording or reproducing information with a light beam which is focused on an optical disk, said method comprising the steps of:
providing a light beam having a given wavelength;

manufacturing an optical disk comprising a substrate of index of refraction n having radially adjacent grooves on at least one surface thereof, each of said grooves having a V-shaped or inverted-trapezoid-shaped cross-section in the radial direction of said disk, with two major sloped side walls each inclined at an angle θ with respect to said substrate surface, each of said side walls constituting a track of pitch p upon which optically discernible information may be recorded or from which optically discernible information may be reproduced by irradiation of said track with a light beam, each of said grooves having an optical depth d defined by the relation d=n p tan θ, the optical depth of each of said grooves being about one-quarter of the wavelength of said light beam; and focusing said light beam through said substrate onto a given track of said optical disk and causing said light beam to scan said given track.

21. A method of recording or reproducing information with a light beam which is focused on an optical disk, said method comprising the steps of:

providing a light beam having a given wavelength;

manufacturing an optical disk comprising a substrate having radially adjacent grooves on at least one surface thereof, each of said grooves having a V-shaped or inverted-trapezoid-shaped cross-section in the radial direction of said disk, with two major sloped side walls each inclined at an angle θ with respect to said substrate surface, each of said side walls constituting a track of pitch p upon which optically discernible information may be recorded or from which optically discernible information may be reproduced by irradiation of said track with a light beam;

each of said grooves having an optical depth d defined by the relation d=n p tan θ, the optical depth of each of said grooves being about one-quarter of the wavelength of said light beam;

projecting said light beam through a transparent medium or index of refraction n which is in contact with said grooves;

focusing said light beam onto a given track of said optical disk; and causing said light beam to scan said given track.

22. A method as set forth in claim 20 or 21, wherein a lens is used to focus said light beam on said given track, wherein the diameter of the cross section of said light beam, at least in the radial direction of said optical disk, is made smaller than the diameter of said lens, so that the incidence of said light beam upon predetermined peripheral portions of said lens adjacent to the rim thereof can be avoided, comprising the additional step of reproducing the recorded information by detecting the variations in time in the intensity of the light rays which are reflected from said optical disk and which pass mainly through said predetermined peripheral portions of said lens.

23. A method as set forth in claim 22 further characterized in that a photosensor which has a first unit cell and a second unit cell is disposed in the passage of the rays of light reflected from said optical disk so that said first and second unit cells are symmetrically located with respect to each other about the center of the image projected over the surface of said photodetector of said lens and the portions of the projected image of said lens corresponding to said predetermined peripheral portions thereof are substantially coincident with said first and second unit cells so that said first and second unit cells can receive the rays of light which are reflected from said optical disk and which pass through the portions of said lens which contain mainly said predetermined peripheral portions of said lens and the outputs from said first and second unit cells are used for reproduction of the stored information.

24. A method as set forth in claim 20 or 21 further characterized in that a train of tracking control pits spaced apart from each other by a predetermined first pitch or frequency is previously recorded along each of the crest lands of said V-shaped or inverted-trapezoid-shaped grooves of said optical disk, a train of tracking control pits spaced apart from each other by a predetermined second pitch or frequency is recorded along each of the bottom lands of said V-shaped or inverted-trapezoid-shaped grooves, and in the case of recording or reproduction, is responsive to the detection of the variations at said first and second frequencies in intensity of light reflected from said optical disk, the spot of said light beam is so controlled to track or scan the center line of each of the side wall surfaces of said V-shaped or inverted-trapezoid shaped grooves of said optical disk.

25. A method as set forth in claims 20 or 21 further characterized in that said V-shaped or inverted-trapezoid-shaped grooves are in the form of a spiral and the spot of said light beam is shifted by a distance equal to the track pitch that is, one half of the distance between the adjacent crests of said spiral V-shaped or inverted-trapezoid-shaped groove in the direction opposite to the direction in which the spot of said light beam is shifted relative to the center of said optical disk toward the center thereof, every time said optical disk makes one complete rotation.

26. The method of recording or reproducing information according to claim 20 or 21, wherein said index of refraction n is about 1.5 and the included angle between adjacent side walls of said grooves is greater than 159 degrees and less than 166 degrees.

27. The method of recording or reproducing information according to claim 20 or 21, further comprising the steps of:

rotating said optical disk;

detecting a portion of the light beam transmitted through or reflected from said given track of said optical disk;

manufacturing said optical disk with the depths of said grooves varying in such a manner that the detected portion of said light beam is modulated at first and second frequencies during each rotation of the disk; and controlling the light beam focused on said given track in response to the modulation at said first and second frequencies of the light beam transmitted through or reflected from said given track, so that the light beam focused on said given track scans along the center line of the said wall of the corresponding one of said grooves.

* * * * *